Sept. 22, 1970      L. S. MATHEW      3,529,690

FOUR-WHEEL DRIVE LOAD CARRYING VEHICLE

Filed April 25, 1968      4 Sheets-Sheet 1

LEONARD STANLEY MATHEW,
INVENTOR

By Wenderoth, Lind & Ponack, Attys

LEONARD STANLEY MATHEW,
INVENTOR

LEONARD STANLEY MATHEW,
INVENTOR

Sept. 22, 1970   L. S. MATHEW   3,529,690
FOUR-WHEEL DRIVE LOAD CARRYING VEHICLE
Filed April 25, 1968   4 Sheets-Sheet 4

United States Patent Office 3,529,690
Patented Sept. 22, 1970

3,529,690
FOUR-WHEEL DRIVE LOAD CARRYING VEHICLE
Leonard Stanley Mathew, Kingswood, Surrey, England, assignor to Matbro Limited, Horley, Surrey, England, a British company
Filed Apr. 25, 1968, Ser. No. 724,116
Claims priority, application Great Britain, May 2, 1967, 20,384/67
Int. Cl. B62d 15/00
U.S. Cl. 180—51                                           9 Claims

ABSTRACT OF THE DISCLOSURE

A load carrying vehicle comprises a chassis including a front chassis frame carried on driven front wheels, and a rear chassis frame mounted on driven rear wheels and connected to the front chassis frame for swivelling relative to the front chassis frame about a vertical axis disposed approximately mid-way between the front and rear wheels, steering means connected to adjust the angle of the front and rear chassis frames relative to each other about said vertical axis, a body for carrying the load which body has at or adjacent the rear end thereof a pivot mounting on the rear chassis frame enabling the body to swivel about a vertical axis, support means on the chassis for the forward end of the body and control means adapted, in dependence on the operation of the steering means to steer the vehicle round a curve, to move the forward end of the body laterally towards the inside of the curve relative to the rear chassis frame.

---

Figure 1:
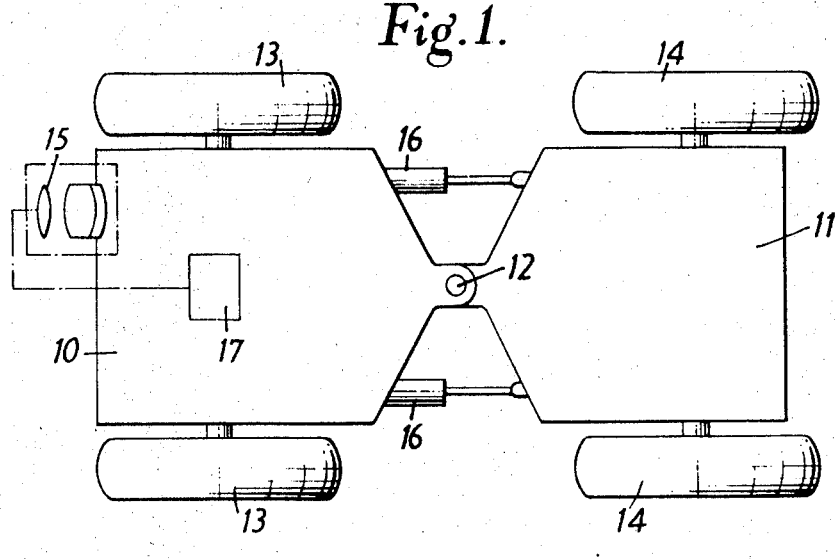

This invention relates to load carrying vehicles and more particularly to such vehicles constructed on a chassis comprising front and rear chassis frames which are supported respectively on driven front and rear wheels and which are relatively pivotable about a vertical axis intermediate the front and rear wheels to steer the vehicle.

According to this invention there is provided a load-carrying vehicle comprising a chassis including a front chassis frame carried on driven front wheels, and a rear chassis frame mounted on driven rear wheels and connected to the front chassis frame for swivelling relative to the front chassis frame about a vertical axis intermediate the front and rear wheels, steering means connected to adjust the angle of the front and rear chassis frames relative to each other about said vertical axis, a body for carrying the load which body has at or adjacent one end thereof a pivot mounting on one of said chassis frames enabling the body to swivel about a vertical axis, support means on the chassis for the other end of the body and control means adapted, in dependence on the operation of the steering means to steer the vehicle round a curve, to shift said other end of the body laterally towards the inside of said curve relative to said one chassis frame.

The control means may for example comprise a pivot connection between said other end of the body and a point on the other of the chassis frames, the body being capable of movement lengthwise of itself relative to one of said chassis frames. Alternatively, the control means may comprise a motor connected between said other end of the body and said one chassis frame and arranged to move said other end of the body laterally relative to said one chassis frame into a position related to the instantaneous relative positions of the front and rear chassis frames about said vertical axis.

The invention also provides a four-wheel-drive load-carrying vehicle comprising a chassis including a front chassis frame carried on driven front wheels, and a rear chassis frame mounted on driven rear wheels and connected to the front chassis frame for swivelling relative to the front chassis frame about a vertical axis disposed approximately mid-way between the front and rear wheels, steering means connected to adjust the angle of the front and rear chassis frames relative to each other about said vertical axis, a body for carrying the load which body has at or adjacent the rear end thereof a pivot mounting on the rear chassis frame enabling the body to swivel about a vertical axis, support means on the chassis for the forward end of the body and control means adapted, in dependence on the operation of the steering means to steer the vehicle round a curve, to move the forward end of the body laterally towards the inside of the curve relative to the rear chassis frame.

Figure 2:
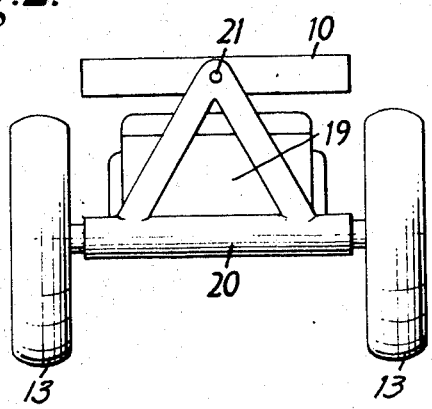
Figure 3:
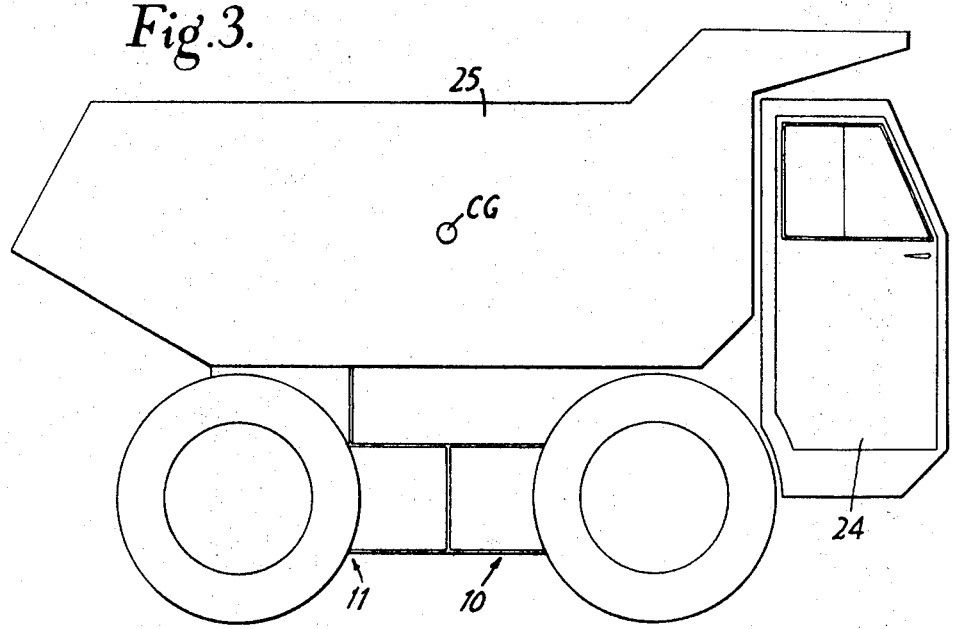
Figure 4:
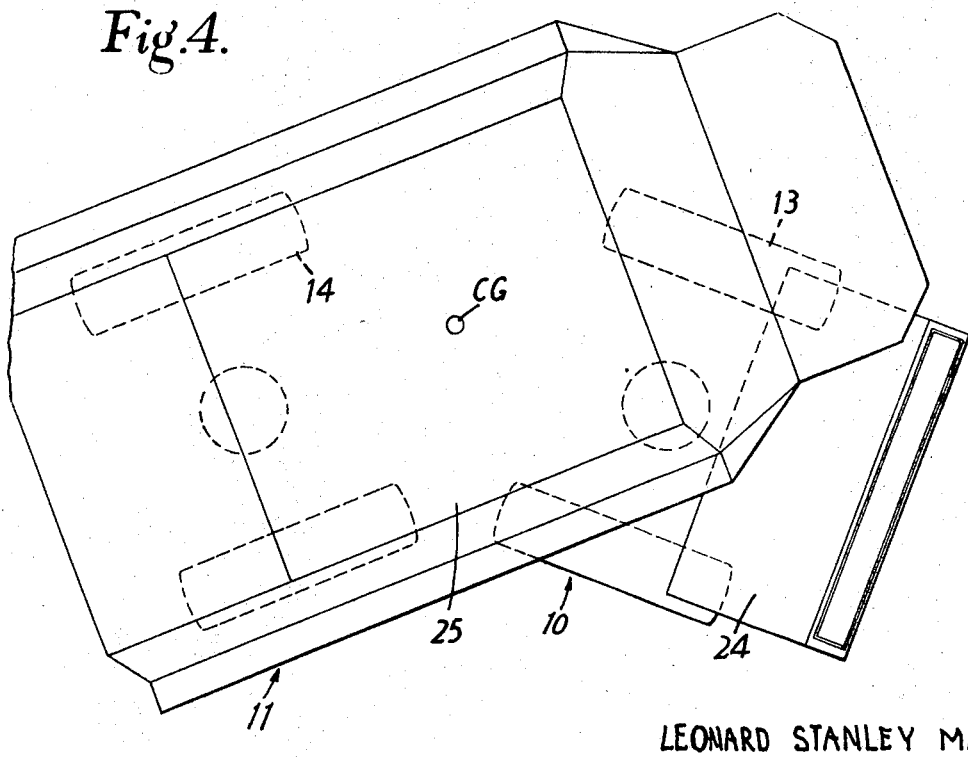
Figure 5:
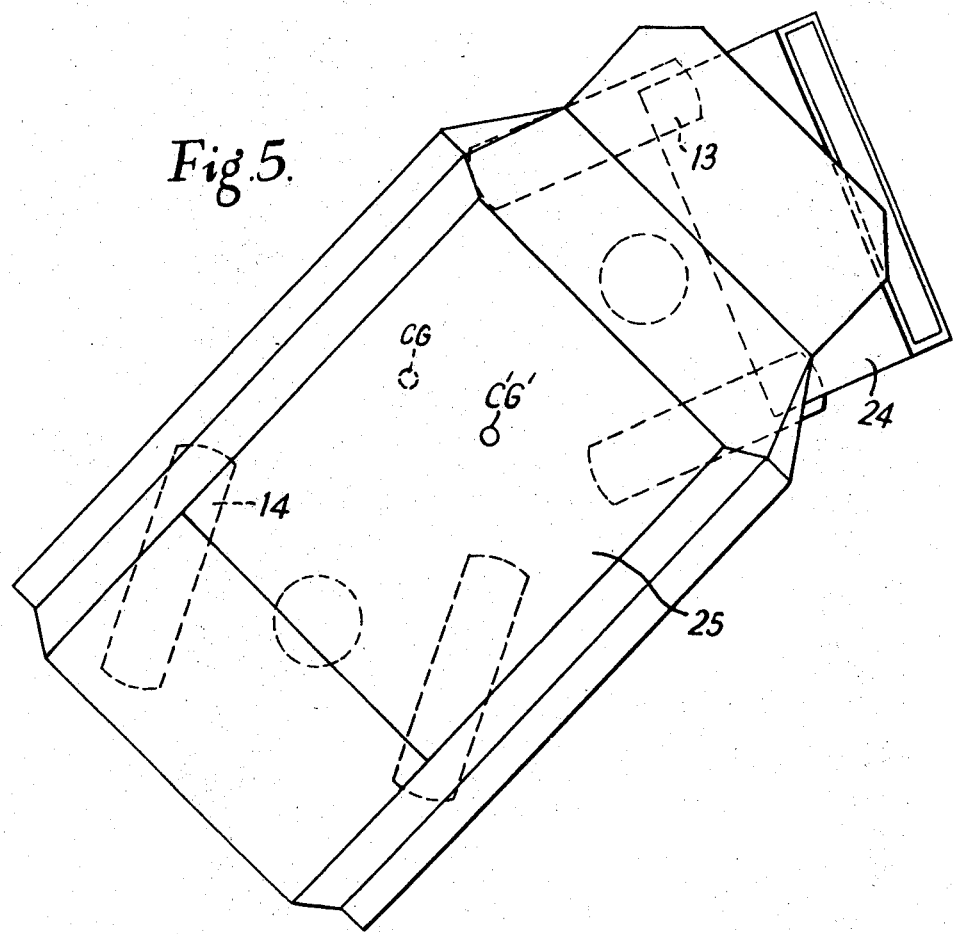
Figure 8:
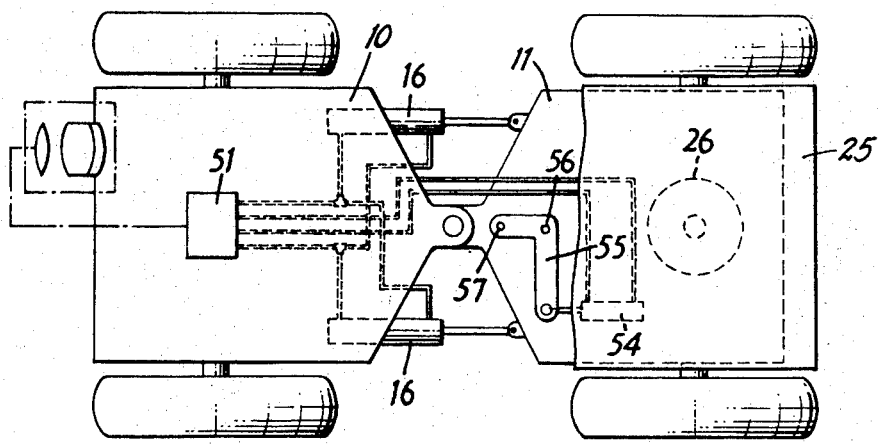
Figure 6:
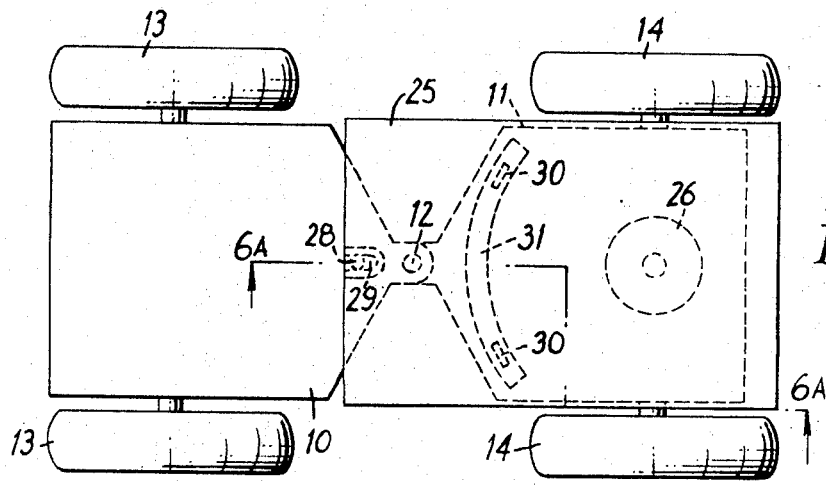
Figure 6A:
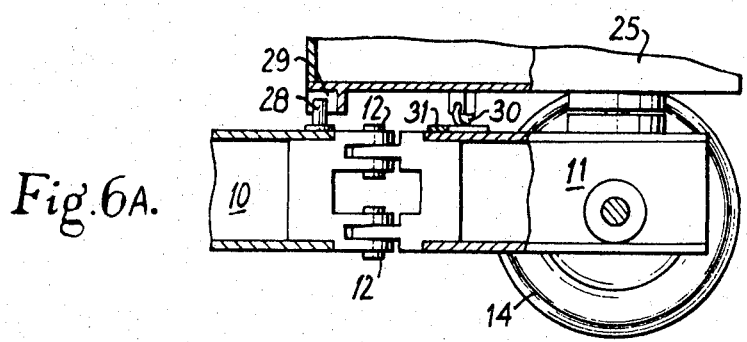
Figure 7:
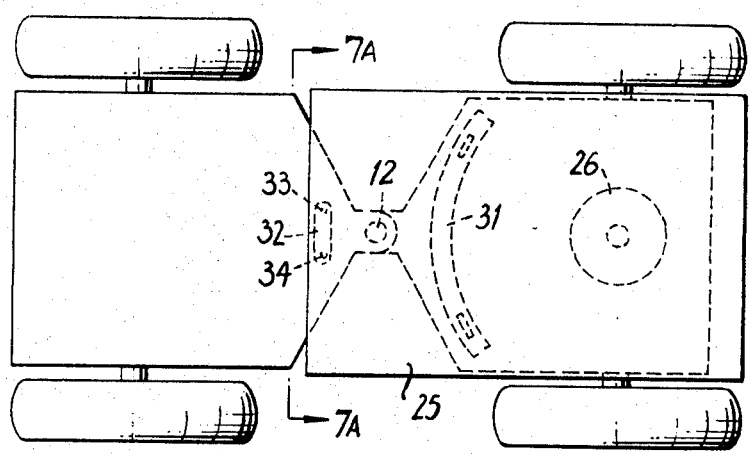
Figure 7A:
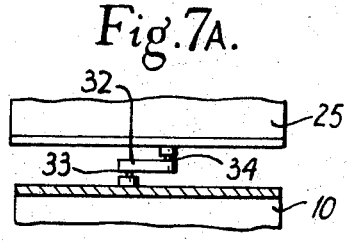
Figure 8A:
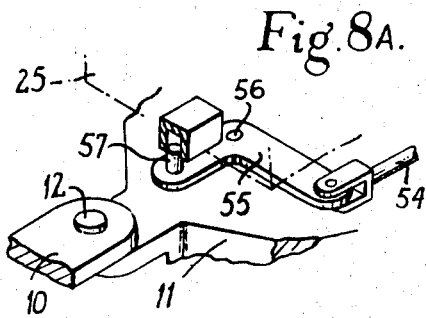

Some embodiments of the invention will now be described by way of example with reference to the accompanying diagrammatic drawings, in which:

FIG. 1 is a plan view of the chassis of a vehicle of the kind to which this invention relates, FIG. 2 indicates the mounting of the engine on the front chassis frame of the construction shown in FIG. 1, FIG. 3 is a side view of a dumper truck constructed on a chassis of the kind shown in FIGS. 1 and 2, FIG. 4 is a plan view of a truck shown in FIG. 3 steering along a curved path, FIG. 5 indicates how according to this invention the centre of gravity of the truck body moves when the truck is steered along a curved path, FIG. 6 is a plan view of one embodiment of the invention, FIG. 6A is a fragmentary axial section on the line 6A—6A of FIG. 6, FIG. 7 is a plan view of a second embodiment of the invention, FIG. 7A is a fragmentary sectional end view on the line 7A—7A of FIG. 7, FIG. 8 is a plan view of a third embodiment of the invention, and FIG. 8A is a fragmentary perspective view of the bell-crank lever of FIG. 8.

Referring first to FIGS. 1 and 2, the chassis of the vehicle is constructed from two fabricated chassis frames 10, 11, the front chassis frame 10 being mounted on front wheels 13 and the rear chassis frame 11 being mounted on rear wheels 14. The chassis frames 10, 11 are coupled together by a stout vertical pin or aligned stout vertical pins 12 disposed approximately mid-way between the front and rear axles and the two chassis frames are pivotable relative to each other about the pin or pins 12, for purposes of steering the vehicle, by two jacks 16, the operation of which is controlled by a driver-operated steering wheel 15 through a suitable hydraulic servo mechanism 17 incorporating a follow-up mechanism. Vehicles constructed on chassis of this general kind have hitherto been towing tractors, shovel loaders and similar heavy-duty vehicles used primarly on public work sites and general off-highway duties. The front and rear wheels may be sprung or unsprung, but in the latter case, in order to enable the vehicle to cross rough terrain without imposing undue strains on the chassis frames and on the pin or pins 12, the engine 19, front wheels 13 and the interconnecting drive transmission are mounted on a sub-frame 20 (FIG. 2) which is pivotally secured to the front chassis frame 10 by horizontal pivot pins 21 which are disposed on the longitudinal centre line of the chassis frame 10. A drive from the engine 19 to the rear wheels 14 may be arranged in any convenient manner.

FIG. 3 shows a load carrying vehicle constructed on a chassis of the general type described above, the driver's cab 24 being mounted at the front end of the front chassis frame 10 and the load carrying body 25, e.g. a tipper body, being rigidly mounted on the rear chassis frame 11. FIG. 4 shows in plan view the effect of operating the steering to negotiate a bend. It will be seen that the centre of gravity CG of the body and its contents moves into a position much closer to a line interconnecting the points of contact of the front and rear wheels 13, 14 which are on the outside of the curve than when the vehicle is travelling in a straight line. Such a vehicle is more susceptible to overturning when cornering than is desirable, and since load-carrying vehicles having chassis of the general type are now coming into use and will tend therefore to be used on public roads, the tendencies to overturning are aggravated by the effects of centrifugal force during cornering owing to the higher speeds at which the vehicles can travel along metalled roads.

Some arrangements according to the invention for alleviating this problem will now be described. In the particular arrangements to be described the body 25, instead of being rigidly mounted on the rear chassis frame 11, is supported adjacent is rearward end for pivotal movement about a vertical axis on a large diameter bearing 26 disposed generally over the rear axle, and means is provided for shifting the front end of the body laterally relative to the rear chassis frame when the vehicle is steering round a curve, the direction of shift being towards the centre of the curve. FIG. 5 illustrates the shift of the centre of gravity from CG to C'G' obtained when the invention is employed. In order to provide the requisite degree of stiffness bearing 26 is made of a large diameter and may for example incorporate a first set of bearings co-operating with flat horizontal annular races to withstand vertical loads, and a second set of bearings co-operating with vertical cylindrical races to withstand the horizontal forces. The steering jacks and other elements are omitted from some of the drawings for purposes of clarity.

In the embodiment shown in FIG. 6, an upstanding pin 28 is secured to the front chassis frame 10 and engages rotatably and slidably in a fore-and-aft extending slot 29 at or adjacent the front end of the body 25. Thus when the steering jacks 16 are operated to steer the vehicle round a corner, and the chassis frame 10 becomes disposed at an angle to the rear chassis frame 11, the pin 28 causes the front end of the body to be shifted laterally relative to the rear chassis frame 11 towards the centre of curvature of the corner, the body rotating about the pivot bearing 26. The provision of the slot enables the resulting changes in the distance between the pin 28 and the centre of the rear bearing 26 during cornering to be accommodated by relative movement of the pin 28 along the slot. These changes in said distance could alternatively be accommodated by the provision of a fore-and-aft sliding joint between the rear pivot bearing 26 and the body or between the rear frame 11 and the rear pivot bearing 26.

An arcuate bearing track 31 is disposed the forward end of the rear chassis frame 11 and is centred on the axis of the rear pivot bearing 26. Rollers 30 mounted on the underside of the body engage the arcuate track so that the weight of the body and its contents is carried by the pivot bearing 26 and the rollers 30 jointly. If desired, part of the weight of the body and its contents may be supported by the pin 28 or by a universal type bearing between the body 25 and the front chassis frame 10.

In the arrangement of FIG. 7, a crank arm 32 extends transversely of the front chassis frame 10 and has at one end a downwardly projecting pivot pin 33 which engages in a socket in the chassis frame 10 and at its opposite end has an upwardly projecting pivot pin 34 which engages in a socket on the underside of the body 25. Thus relative rotational movements of the chassis frames 10 and 11 about the pivot pin 12 cause the forward end of the body to be shifted laterally by the link, but in this instance the variation of the distance between the centre of the bearing pivot 26 and any fixed point on the fore-and-aft extending centre line of the chassis frame 10 is accommodated by rotation of the link about its pivot pin 33 with the chassis frame 10. The weight of the body and its contents may be distributed between the link and the rear pivot bearing, or an arcuate track and co-operating rollers or a universal bearing may be provided as described in relation to the arrangement of FIG. 6.

It will be understood that in both of these arrangements, the force necessary for moving the front end of the body laterally is provided by the steering jacks 16.

Referring now to FIG. 8, an arrangement is shown in which the lateral shifting of the front end of the body is actuated by the steering control movements of the driver of the vehicle. The servo valve 51 which is operated by movements of the steering wheel also controls a supply of fluid to opposite ends of a control jack 54 which is pivotally connected between a fixed point on the rear chassis frame 11 and one arm of a bellcrank lever 55 pivotally mounted at 56 on the chassis frame 11. The other arm of the bellcrank lever carries a pivot pin 57 which is rotatable and slidable in a socket on the underside of the body of the vehicle. Operation of the steering wheel is arranged to actuate the hydraulic jack 54 so as to swing the pivot pin 57 towards the inside of the curve along which the vehicle is being steered. Owing to the provision of the follow-up mechanism, there is a unique position of the pivot pin 57 for each position of the steering jacks 16.

A supporting track for the front end of the body may be provided in the arrangement of FIG. 8 similar to that shown in FIG. 6.

I claim:

1. A four-wheel-drive load-carrying vehicle comprising a chassis including a front chassis frame carried on driven front wheels, and a rear chassis frame mounted on driven rear wheels and pivotally connected to said front chassis frame for swivelling relative to said front chassis frame about a vertical axis disposed approximately mid-way between the front and rear wheels which axis is fixed with respect to each of the said chassis frames individually, steering means connected to adjust the angle of the front and rear chassis frames relative to each other about said vertical axis, a body for carrying the load which body has at or adjacent the rear end thereof a pivot mounting on the rear chassis frame enabling the body to swivel about a vertical axis, support means having a portion secured to one of said chassis frames and another portion secured to the forward end of the body and permitting relative longitudinal displacement between said chassis frame secured portion and said body secured portion when said chassis frames are pivoted relative to each other about the first mentioned axis, which support means is adapted in dependence on the operation of the steering means to steer the vehicle round a curve, to move the forward end of the body laterally towards the inside of the curve relative to the rear chassis frame.

2. A vehicle as claimed in claim 1, wherein said support means further comprises an arcuate track and roller means in rolling engagement with the track, the track and roller means being mounted one on the rear chassis frame and the other on the body.

3. A vehicle as claimed in claim 1, wherein the support means comprises a pivot connection between the forward end of the body and a point on the front chassis frame.

4. A vehicle as claimed in claim 3, wherein the pivot connection comprises a vertical pin and a slot in which the pin is rotatably received and along which the pin is slidable lengthwise of the vehicle, the pin and slot being provided one on the front chassis frame and the other on the forward end of the body.

5. A vehicle as claimed in claim 3, wherein the pivot connection comprises a laterally extending link connected between the forward end of the body and the front chassis frame.

6. A vehicle as claimed in claim 1, wherein said support means further includes a control means comprising a motor connected between one of said support means portions and the rear chassis frame and arranged, in dependence on the operation of the steering means to steer the vehicle round a curve, to move the forward end of the body laterally towards the inside of the curve relative to the rear chassis frame.

7. A vehicle as claimed in claim 6, wherein said motor is a hydraulic jack.

8. A vehicle as claimed in claim 7, wherein said support means portions further comprises a bell crank lever mounted for pivotal movement about a vertical axis on one of said chassis frames and having one of its arms extending in a fore-and-aft direction relative to that chassis frame and connected to the forward end of the body through an upstanding pivot and socket connection, said hydraulic jack being pivotally connected between the other arm of the lever and the chassis frame which carries the lever.

9. A vehicle as claimed in claim 7, wherein said steering means includes a driving member under the control of the driver and a servo valve mechanism of the follow-up type controlled by said driving member, said servo valve mechanism controlling a supply of pressure fluid for operating the motor.

References Cited

UNITED STATES PATENTS

| | | | |
|---|---|---|---|
| 1,113,071 | 10/1914 | Turner | 180—50 |
| 1,299,973 | 4/1919 | Lloyd. | |
| 1,364,817 | 1/1921 | Slocum | 180—50 |
| 1,396,598 | 11/1921 | Schneider | 180—50 X |
| 1,398,578 | 11/1921 | Stewart | 180—50 |
| 2,132,107 | 10/1938 | Hamm. | |
| 3,211,498 | 10/1965 | Peller | 180—51 X |
| 3,282,367 | 11/1966 | Mathew et al. | 180—51 |

A. HARRY LEVY, Primary Examiner

U.S. Cl. X.R.

180—79.2